(12) United States Patent
Ross et al.

(10) Patent No.: US 9,878,596 B2
(45) Date of Patent: Jan. 30, 2018

(54) AIR VENT OF A VENTILATION AND HEATING MODULE FOR MOTOR VEHICLES WITH SWITCHING BETWEEN A SPOT POSITION AND A DIFFUSE POSITION

(75) Inventors: Steffen Ross, Wettstetten (DE); Reinhold Nadler, Stammham (DE); Hannes Foidl, Tauberfeld (DE); Gerhard Endres, Mainleus (DE)

(73) Assignee: AUDI AG, Ingolstadt (DE)

( * ) Notice: Subject to any disclaimer, the term of this patent is extended or adjusted under 35 U.S.C. 154(b) by 891 days.

(21) Appl. No.: 13/882,001

(22) PCT Filed: Jun. 15, 2012

(86) PCT No.: PCT/EP2012/002525
§ 371 (c)(1),
(2), (4) Date: Apr. 26, 2013

(87) PCT Pub. No.: WO2013/045004
PCT Pub. Date: Apr. 4, 2013

(65) Prior Publication Data
US 2013/0225058 A1    Aug. 29, 2013

(30) Foreign Application Priority Data
Sep. 28, 2011    (DE) .................. 10 2011 115 178

(51) Int. Cl.
*B60H 1/34*    (2006.01)

(52) U.S. Cl.
CPC ............. *B60H 1/3421* (2013.01); *B60H 1/34* (2013.01); *B60H 1/345* (2013.01)

(58) Field of Classification Search
CPC ...................................................... B60H 1/34
(Continued)

(56) References Cited

U.S. PATENT DOCUMENTS 4,887,520 A * 12/1989 Bauer .................. B60H 1/0065
454/155
5,063,833 A * 11/1991 Hara ...................... B60H 1/345
454/152

(Continued)

FOREIGN PATENT DOCUMENTS

DE    82 05 996.9    7/1982
DE    44 22 537    1/1996

(Continued)

OTHER PUBLICATIONS

International Search Report issued by the European Patent Office in International Application PCT/EP2012/002525 dated Oct. 17, 2012.

*Primary Examiner* — Steven B McAllister
*Assistant Examiner* — Samantha Miller
(74) *Attorney, Agent, or Firm* — Henry M. Feiereisen LLC (57) ABSTRACT

An air vent of a ventilation and heating module for motor vehicles has at least horizontally extending air guide vanes which can be pivoted about a first axis and which are each coupled with a coupling element. At least one air guide vane is coupled via a coupling rod to the coupling element which is displaceable relative to the first axis in a displacement direction between a neutral position and a diffuse position of the air guide vanes. The coupling rod for each air guide vane is formed as a rocker, which is coupled at one end with an air guide vane and is pivotally coupled at the other end with the ventilation and module. Each rocker is coupled to the coupling element via a sliding block guide.

16 Claims, 9 Drawing Sheets

(58) Field of Classification Search
USPC .......................................................... 454/155
See application file for complete search history.

(56) References Cited

U.S. PATENT DOCUMENTS

| | | | |
|---|---|---|---|
| 5,340,357 A * | 8/1994 | Nagai et al. .................. | 454/155 |
| 5,364,303 A * | 11/1994 | Terry ............................ | 454/155 |
| 5,470,276 A * | 11/1995 | Burnell et al. ................ | 454/155 |
| 5,520,579 A * | 5/1996 | Saida ............................ | 454/155 |
| 5,690,550 A | 11/1997 | Mikowski | |
| 6,131,336 A * | 10/2000 | Krause et al. ................ | 49/74.1 |
| 6,394,891 B1 * | 5/2002 | Arold ............................ | 454/155 |
| 6,554,696 B2 * | 4/2003 | Kowalski et al. ............ | 454/155 |
| 6,582,293 B1 * | 6/2003 | Siniarski et al. ............. | 454/155 |
| 6,800,023 B2 * | 10/2004 | Demerath ..................... | 454/155 |
| 7,887,400 B2 * | 2/2011 | Shibata et al. ................ | 454/155 |
| 7,997,964 B2 * | 8/2011 | Gehring et al. .............. | 454/155 |
| 8,876,579 B2 * | 11/2014 | Browne et al. ................ | 454/75 |

FOREIGN PATENT DOCUMENTS

| | | |
|---|---|---|
| DE | 298 17 513 | 2/1999 |
| DE | 201 00 740 | 7/2001 |
| DE | 100 46 628 | 3/2002 |
| EP | 1 086 838 | 3/2001 |
| EP | 1 541 395 | 6/2005 |
| EP | 1 752 324 | 2/2007 |

* cited by examiner

AIR VENT OF A VENTILATION AND HEATING MODULE FOR MOTOR VEHICLES WITH SWITCHING BETWEEN A SPOT POSITION AND A DIFFUSE POSITION

CROSS-REFERENCES TO RELATED APPLICATIONS

This application is the U.S. National Stage of International Application No. PCT/EP2012/002525, filed Jun. 15, 2012, which designated the United States and has been published as International Publication No. WO 2013/045004 A1 and which claims the priority of German Patent Application, Serial No. 10 2011 115 178.1, filed Sep. 28, 2011, pursuant to 35 U.S.C. 119(a)-(d).

BACKGROUND OF THE INVENTION

The invention relates to an air vent of a ventilation and heating module for motor vehicles.

DE 201 00 740 U1 discloses a generic air vent of this type for a vehicle air conditioning system with several air guide vanes arranged in a frame and pivotable about an axis. Additionally, a first coupling element pivotally coupled to the air guide vanes is provided, wherein the first coupling element is adjustable relative to the axes of the air guide vanes between a neutral position in which the air guide vanes are parallel and a comfort position wherein for forming a diffuse position, the air guide vanes are pivoted in opposite directions, i.e. fanned, thus producing a diverging air flow. A spot position of the air guide vanes can be adjusted with a second coupling element, which is arranged in air outlet area and displaceable perpendicular to the displacement direction of the first coupling element and coupled with the air guide vanes. Such spot position can be set with a control element arranged on the neutral vane. The neutral vane represents the central air guide vane of an odd number of air routing vanes.

For adjusting the air guide vanes into the diffuse position, a control element constructed as a two-armed lever is provided with this conventional air vent, which contacts with one end the first coupling element and with the other end a button which has a locking mechanism and is accessible from the outside of the air vent. By pressing the button, the first coupling element is displaced in a translational movement toward the second coupling element into the diffuse position. The first coupling element is held in this position by the locking mechanism, until the control element is released by a renewed operation of the button, whereby the first coupling element is pulled into the neutral position of the air guide vanes by a return spring.

In this conventional approach, the mechanism for generating the diffuse position as well as for setting a spot position of the air guide vanes initiated from the neutral position is arranged in the region of the air outlet opening of the air vent so that this mechanism is visible to a vehicle occupant, thereby adversely affecting the visual impression. This disadvantage can not be entirely prevented even when, as proposed in the DE 201 00 740 U1, the first coupling element is coupled to the outer vanes via coupling rods. A further disadvantage with regard to the use of such coupling rods is that the mechanism becomes more complex and thus also more susceptible to malfunctions.

Furthermore, DE 100 46 628 A1 discloses an automatic heating and/or climate control for vehicles which has automatic nozzles for the air distribution and air volume control. These nozzles are arranged in the instrument panel, on the door or on the floor as central nozzles or as side nozzles, wherein horizontal and vertical motor-driven air guide vanes are arranged on the nozzle for adjusting the direction of the air flow and motor-driven air flow dampers are also provided for adjusting the quantity of air. The air guide vanes and the air quantity dampers are adjusted via an automatic program stored in a control unit, which also generates the control signals for the actuators for a correct adjustment of the air guide vanes. The driver can intervene in the automatic adjustment of the so-called automatic nozzles by using a nozzle control panel where he can select predetermined factory-set standard programs for setting the vanes and air volume as desired. He can also manually intervene on adjustment elements arranged on the vanes and adjust the vanes in the horizontal and vertical direction and hence adjust the air flow direction in the vehicle interior. These new settings can also be stored as user-defined settings.

However, DE 100 46 628 A1 does not provide any suggestions relating to the mechanics for adjusting the air guide vanes and the air quantity dampers.

It is an object of the invention to improve an air vent of the aforedescribed type so as to reduce space requirements, in particular in the outlet area of the air flow, and attain a high-quality visual impression without the need for a complex mechanism.

SUMMARY OF THE INVENTION

Such an air vent of a ventilation and heating module for motor vehicles has at least has horizontally extending air guide vanes, which can be pivoted about a vehicle-fixed axis and are each coupled to a coupling element, wherein at least one air guide vane is coupled via a coupling rod to the coupling element and the coupling element is displaceable relative to the vehicle-fixed axis in a displacement direction between at least one position causing a neutral position and a diffuse position of the air guide vanes. The coupling rod of each air guide vane is constructed as a rocker which is at one end coupled with an air guide vane and is at the other end pivotally coupled to the ventilation and module, and that each rocker is coupled with the coupling element via a sliding block guide.

With this air vent according to the invention, the essential parts of the adjusting mechanism by rockers for the air guide vanes are moved to the invisible area of the air vent, so that these are no longer visible to a vehicle occupant from the front, thus enabling a design of such an air vent according to the invention with a high-quality visual appearance. Furthermore, the adjusting mechanism according to the invention requires fewer parts compared to the aforedescribed prior art, thereby lowering the cost of such air vent in comparison with the prior art due to the reduced complexity. The reduced mechanical complexity also reduces the complexity of assembly, thus also lowering the installation costs.

In an advantageous further development of the invention, a neutral vane is provided, wherein the rocker arm associated with the neutral vane is coupled with the coupling element via a rectilinear sliding block guide, wherein at least one outer vane is provided on each side of this neutral vane; the respective rocker associated with each outer vane for producing the diffuse position is coupled with the coupling element via curved sliding block guides. Because the components responsible for producing the diffuse position of the air guide vanes, such as the coupling element, are moved back into the no longer visible area of the air vent and the rockers producing the coupling between the air guide vanes and the coupling element result in long lever arms, the movement of the air guide vanes can be designed or implemented with a high perceived quality.

In one embodiment of the invention, the coupling element may be displaceable perpendicularly to its displacement direction for generating a spot position of the air guide vanes, wherein the rocker of a neutral vane is coupled to the ventilation and heating module by way of a sliding block guide enabling a pivoting motion, and the rocker of at least outer vane arranged on either side of the neutral vane is coupled to the outer vanes via a sliding block guide enabling a pivoting motion. so that any spot position of the air guide vanes can be set. It is particularly advantageous that the diffuse position can be adjusted from any spot position by moving the coupling element. Conversely, the diffuse position of the conventional air vent disclosed in DE 201 00 740 U1 can only be adjusted from a neutral position in which all the air guide vanes are aligned in parallel.

According to another particular advantageous embodiment of the invention, a movable slider plate having a driver opening receiving the coupling element may be provided, with which a translatory movement of the slider plate is transmitted to the coupling element, wherein for generating a spot position of the air guide vanes, the driver opening is preferably designed to move the coupling element perpendicular to its displacement direction. This constitutes a simple mechanical construction, so that the coupling element is carried along only by the displacement of the slider plate in the displacement direction, whereas the driver opening is at the same time configured in the direction perpendicular thereto so that the coupling element can be moved within the driver opening for setting a spot position.

According to an advantageous embodiment of the invention, in order to always attain a precisely defined diffuse position, the coupling element may be coupled with a housing wall of the ventilation and heating module via a sliding block guide for centering the diffuse position of the air guide vanes. Preferably this sliding block guide is essentially heart-shaped with the apex of the heart-shape extending in the displacement direction of the coupling element, wherein the diffuse position is produced by guiding the coupling element into the apex of the heart with a coupling pin. In particular, a harmonic movement of the coupling element from a position effecting a spot position to a position effecting the diffuse position can be attained with this heart shape.

In a particularly advantageous embodiment, an reset lever articulated in the area of the outlet opening of the air vent may be provided, which can be pivoted by coupling with the coupling element into a memory position corresponding to the spot position of the air guide vanes, wherein the free end of the reset lever pivoted into the memory position is, while maintaining its pivot position, operatively connected with a slider plate that is in turn operatively connected to the coupling element in a position effecting the diffuse position of the air guide vanes via the displacement excursion of this slider plate, and the coupling of the reset lever is configured as a sliding block guide, which upon displacement of the slider plate from the position effecting the diffuse position causes the coupling element to be carried along into the memory position.

A memory function is realized with such a reset lever, wherein the coupling element is, after leaving the diffuse position, returned to the position of the coupling element prior to its displacement into the position effecting the diffuse position. This is particularly advantageous when the coupling element is displaced by an actuator-driven slider plate, so that after the coupling element is returned from the position effecting the diffuse position, the air guide vanes again assume the spot position of the air guide vanes that were, for example, originally set by the driver of the vehicle.

According to a further improvement regarding this memory function, the reset lever may have a positioning pin engaging with the guideways of the slider plate for producing the operative connection of the free end of the reset lever with the slider plate. Such parallel guideways produce a raster effect, so that the associated position of the reset lever is substantially maintained for each spot position of the air guide vanes. The accuracy of the position acquisition can be set through suitable adjustment of the raster width of the guideways.

According to a further improvement, the reset lever may be coupled to the coupling element in a simple manner with the coupling pin of the sliding block guide, which causes the coupling of the coupling element to the housing wall of the ventilation and heating module.

According to another particularly advantageous embodiment of the invention, the slider plate is operatively connected to a spring element which is articulated on the housing wall of the ventilation and heating module; the spring force of the spring element urges the slider plate either into a spot position of the air guide vanes or into a position effecting its diffuse position, wherein the spring element passes its dead center position with maximum spring force when the slider plate is displaced between a position effecting the spot position of the air guide vanes and their diffuse position. The diffuse position can thus be canceled by manual control, so that the coupling element is moved into a position corresponding to a spot position. The reset lever ensures that this position corresponds to the spot position before the changeover into the diffuse position.

According to a further improvement of the invention, a control element may be provided for manually operating at least one of the air guide vanes, wherein the sliding block guide is formed in the housing wall of the ventilation and heating module, determining the movement of the coupling element upon operation of the control element into the diffuse position of the air guide vanes. This movement of the coupling element is transferred to the slider plate, passing the dead point of the spring element. This allows a simple operation by a vehicle occupant, in particular even when due to an actuator-initiated displacement of the slider plate caused by an air conditioning system into a position effecting the diffuse position is to be canceled by operating the control element.

In a further improvement according to the invention, the slider plate may be constructed in two parts, with a first slider part receiving the coupling element and a second slider part coupled to the first slider part, wherein the second slider part receives the guideways for coupling to the free end of the reset lever.

According to another advantageous embodiment of the invention, a coupling pin may be used for easily coupling the coupling element with the sliding block guide in the housing wall of the ventilation and heating module. Preferably, this coupling pin is also provided for coupling the coupling element to the rocker associated with the neutral vane. This results in a simple mechanical structure, since the coupling element is coupled by the coupling pin to the rocker of the neutral vane as well as to the sliding block guide in the housing wall of the ventilation and heating module and also to the reset lever.

According to one particularly advantageous embodiment of the invention, a drive unit may be used for switching between a spot position of the air guide vanes and the diffuse position and vice versa, by connecting the slider plate with this drive unit, preferably embodies as an electric motor. The ventilation and heating module can then operate as an air-conditioning system in accordance with a preset program and adjust with this drive the air guide vanes from a spot position to their diffuse position and vice versa.

Finally, it is particularly advantageous to combine the mechanical components into a standard module, which allows such a standard module to be installed in a preconfigured air vent housing with air guide vanes. In particular, the standard module should be constructed so that with conventional air vents, i.e. air vents for which coupling rods are provided for adjusting the air guide vanes, these coupling rods can be exchanged against such an inventive standard module.

Such standard module can advantageously be easily installed and pre-tested.

BRIEF DESCRIPTION OF THE DRAWING

Exemplary embodiments of the invention will now be described in detail with reference to the accompanying figures, which show in.

DETAILED DESCRIPTION OF PREFERRED EMBODIMENTS

FIGS. 1 to 4 show an air vent 1 of a ventilation and heating module 10, for example an air conditioning system for motor vehicles, having three air guide vanes 2, 2a and 2b arranged side-by-side, i.e., a central air guide vane 2, also called neutral vane, and respective adjacent air guide vanes 2a and 2b, also called outer vanes.

These air guide vanes 2, 2a and 2b are at one end pivotally supported by a vehicle-fixed axis 3 in the air vent 1 and are at the other end each coupled via a respective rocker 5, 5a and 5b with a coupling element 4 via a respective sliding block guide 6, 6a and 6b.

The rocker 5 associated with the neutral vane 2 is with one end pivotally connected to the neutral vane 2, while the other end is connected via a sliding block guide 7 to the air vent 1. This sliding block guide includes a slot 7 arranged at the end of the rocker 5 as a motion link, in which a pin of the air vent 1 engages.

The rocker 5a and 5b is connected at one end via a sliding block guide 7a and 7b, respectively, with the outer vane 2a or 2b and is at the other end pivotally connected to the air vent 1. The two sliding block guides 7a and 7b are each designed as a respective slot 7a or 7b disposed in the rocker 7a and 7b, with a respective pin of the outer vane 2a or 2b engaging in the respective slot.

The coupling element 4 is formed substantially rectangular and plate-shaped and has three pins 4a, 4b and 4c which are aligned vertically with respect to a displacement direction R, wherein the pin 4a operates as a coupling pin and provides coupling, in addition to coupling to the rocker 5 via a slot arranged in the rocker 5, as a motion link of the sliding block guide 6 to other parts of the air vent 1. The pin 4b and 4c engages in a motion link of sliding block guide 6a and 6b for coupling with the rocker 2a and 2b, where the motion links of the sliding block guides 6a and 6b are each formed as a slightly curved slot.

Figure 1:
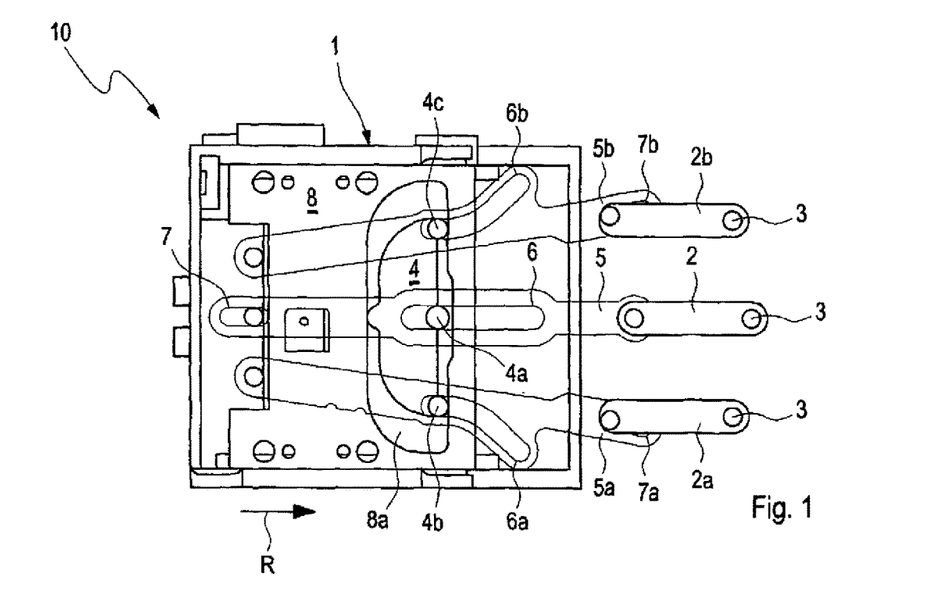
FIG. 1 a schematic side view of an air vent of a first exemplary embodiment according to the invention with air guide vanes in a neutral position, FIG. 2 a schematic side view of an air vent according to FIG. 1 with air guide vanes in a diffuse position, FIG. 3 a schematic side view of an air vent according to FIG. 1 with air guide vanes in a spot position, FIG. 4 a schematic side view of an air vent according to FIG. 2 with a sliding block guide centering the diffuse position, FIG. 5 a schematic side view of an air vent of a second exemplary embodiment according to the invention with a reset lever for realizing a memory function, FIG. 6 a schematic side view of an air vent according to FIG. 5 for illustrating the operation of the memory function, FIG. 7 a schematic side view of an air vent of a third exemplary embodiment according to the present invention with manual switching from the diffuse position of the air guide vanes into a spot position.
Figure 2:
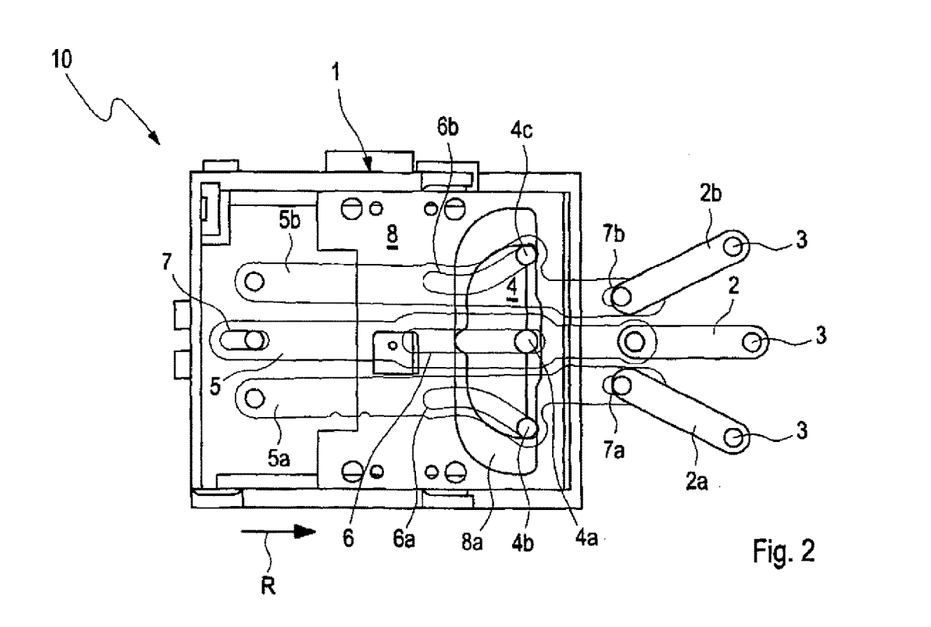
Figure 3:
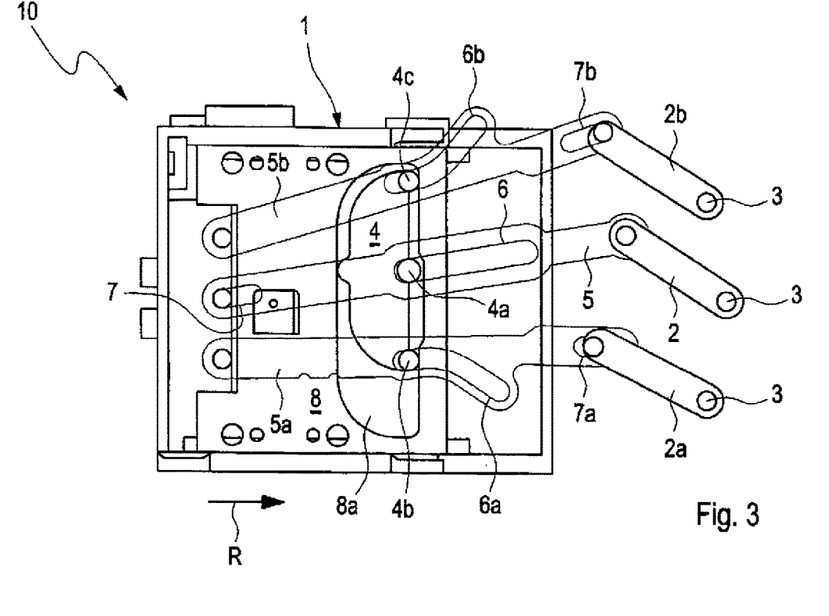
Figure 4:
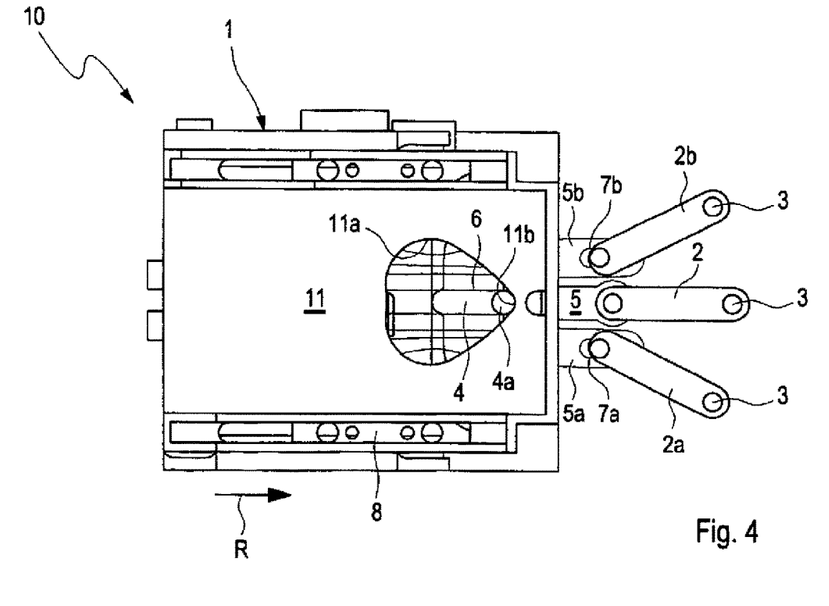

A slider plate 8, which is displaceably supported in a displacement direction R in the housing of the air vent 1, is provided for displacing the coupling element 4 in the displacement direction R from the position shown in FIG. 1, i.e. a neutral position of the air guide vanes 2, 2a and 2b (all air guide vanes 2, 2a and 2b are oriented in parallel), into a position effecting the diffuse position of the air guide vanes 2, 2a and 2b, as shown in FIG. 2, or into a position which results in a spot position of the air guide vanes 2, 2a and 2b according to FIG. 3.

This slider plate 8 has in its plane a driver opening 8a for completely receiving the coupling element 4. This driver opening 8a is formed so that, on the one hand, the coupling element 4 is carried along in the same or in the opposite direction of the displacement direction R during a movement of the slider plate 8, and, on the other hand, a movement of the coupling element 4 perpendicular to the direction R is enabled. This means that a significant relative movement between the coupling element 4 and the slider plate 8 in the direction of R is substantially prevented; however, a relative movement is possible due to the greater extent of the driver opening 8a perpendicular to the displacement direction R compared to the corresponding length of the coupling element 4.

When the slider plate 8 is moved out of the position shown in FIG. 1 in the displacement direction R, the rockers 2, 2a and 2b coupled to the coupling element 4 are pivoted in relation to the air vent 1 so that according to FIG. 2 the position of the neutral vane 2 does not change due to the straight motion link of sliding block guide 6, whereas the outer vanes 2a and 2b are pivoted into a diffuse position due to the curved shape of the motion links of the sliding block guides 6a and 6b, producing a diverging air flow due to the fan-shaped orientation of these outer vanes 2a and 2b. To enable this adjustment of the outer vanes 2a and 2b, the two rockers 5a and 5b are connected with the two outer vanes 2a and 2b by way of the motion links of the sliding block guides 7a and 7b which are formed as slots.

The air guide vanes 2, 2a and 2b can also be adjusted from the neutral position illustrated in FIG. 1 to any desired spot position, as shown in FIG. 3, wherein the three air guide vanes 2, 2a and 2b are pivoted in parallel from the neutral position, thus producing a downwardly directed air flow. This is made possible by a manually operable control element, which is connected, for example, to the neutral vane 2, as schematically shown for example in FIGS. 7a and 7b. The manual pivoting movement of the neutral vane 2 is transmitted by the rocker 5 to the coupling pin 4a of the coupling element 4, displacing this coupling element 4 vertical with respect to the displacement direction R and causing the outer vanes 2a and 2b to be pivoted through coupling with the rockers 5a and 5b.

The air guide vanes 2, 2a and 2b can also be pivoted from this spot position according to FIG. 3 into the diffuse position by displacing the slider plate 8. To this end, according to FIG. 4, the coupling element 4 is coupled with a housing wall 11 of the air vent 1 by displacing the slide vane 8 via a sliding block guide 11a which has a heart-shaped motion link 11a that guides the coupling pin 4a of the coupling element 4 according to the heart-shaped curve. The heart-shaped motion link 11a is oriented in the housing wall 11 so that its heart-shaped apex 11b centers the coupling pin 4a in the diffuse position. This housing wall 11 is not shown in FIGS. 1, 2 and 3 for sake of clarity. The centering function of the heart-shaped apex 11b is also operative when the coupling element 4 is displaced from the neutral position according to FIG. 1 into the position effecting the diffuse position of the air guide vanes 2, 2a and 2b according to FIG. 2.

Figure 9:
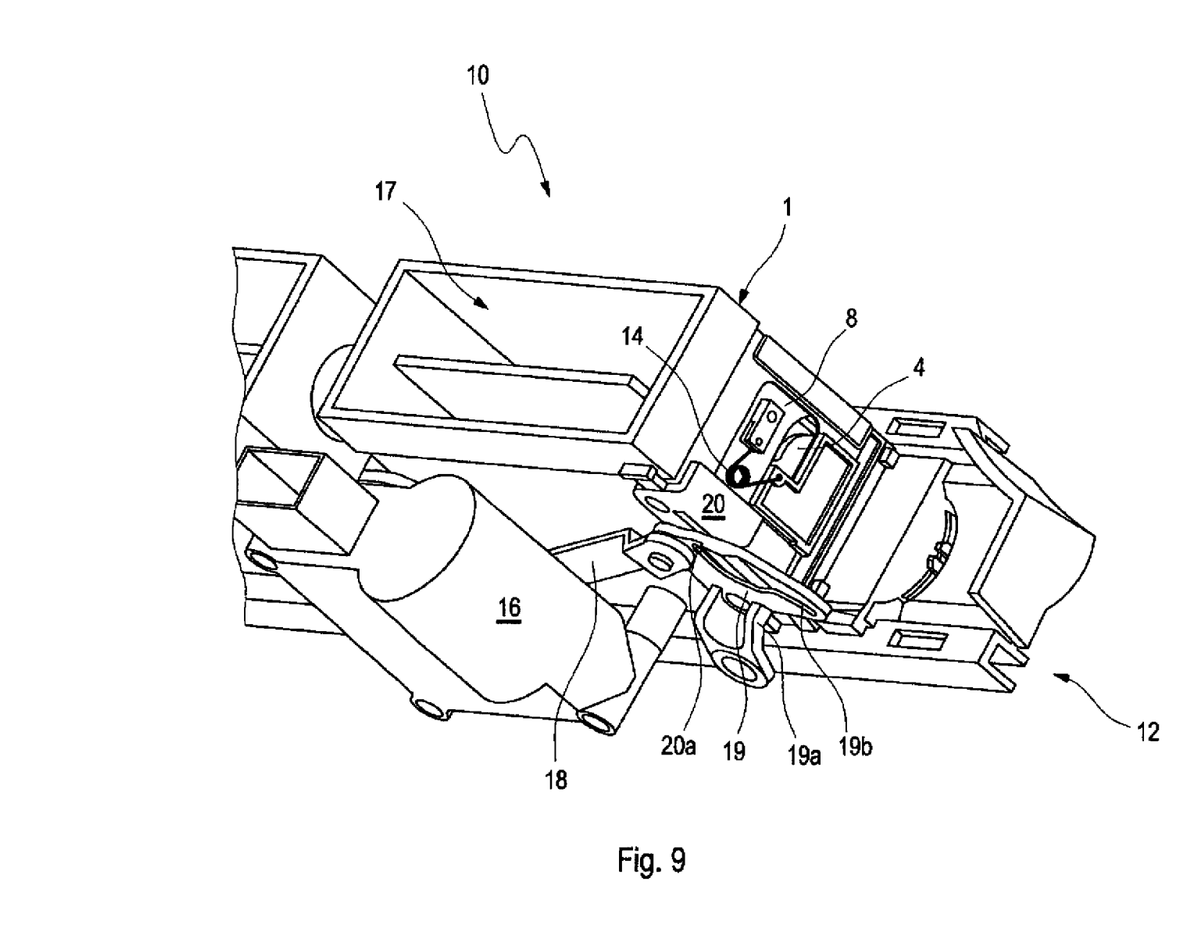

The slider plate 8 for generating the diffuse position of the air guide vanes 2, 2a and 2b is moved with an actuator embodied as a drive unit 16 constructed as an electric motor, as shown in FIG. 9. In this perspective view of the ventilation and heating module 10, the part intended for installation in, for example, the instrument panel of a vehicle is not visible, meaning the rear portion of the air vent 1 with an air inlet opening 17 and a lower portion in which the electric motor 16 is installed. The air outlet opening 12 of the air vent 1 is not visible in this representation.

For actuator-operated adjustment of the slider plate 8, the drive shaft of the electric motor 16 is in rotationally fixed engagement with a drive lever 18, wherein the free end of the drive lever 18 is rotatably coupled to a drive plate 19 which is in turn articulated for rotation via a lever arm 19a on the bottom side of the air vent 1. Furthermore, the drive plate 19 has a multi-arc-shaped motion link 19b, in which a drive pin 20a of a slide part 20 that is operatively connected to the slider plate 8 engages.

Figure 10:
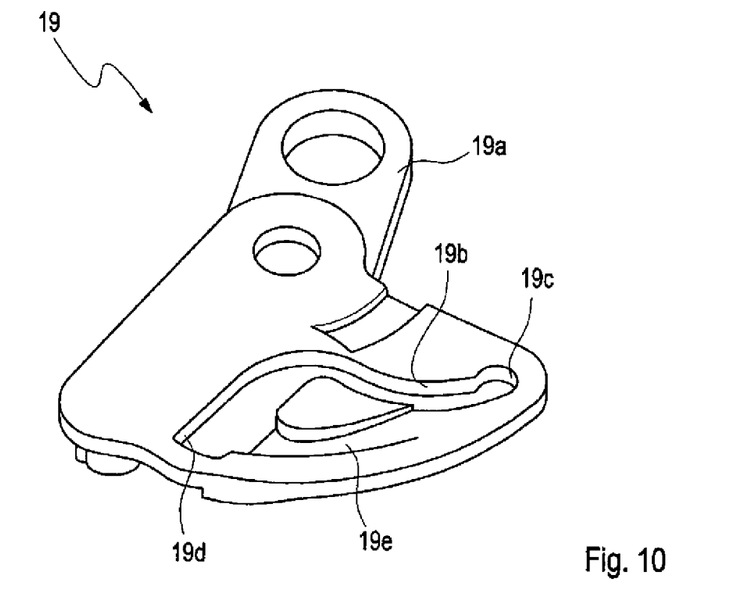

FIG. 10 shows in more detail the drive plate 19 with the substantially S-shaped motion link 19b, which has a motion link beginning 19c and a motion link end 19b, wherein a guide groove 19e extends from the motion link end 19d back to the region of the motion link beginning 19c. Moreover, the drive plate 19 is elastic.

Figure 11:
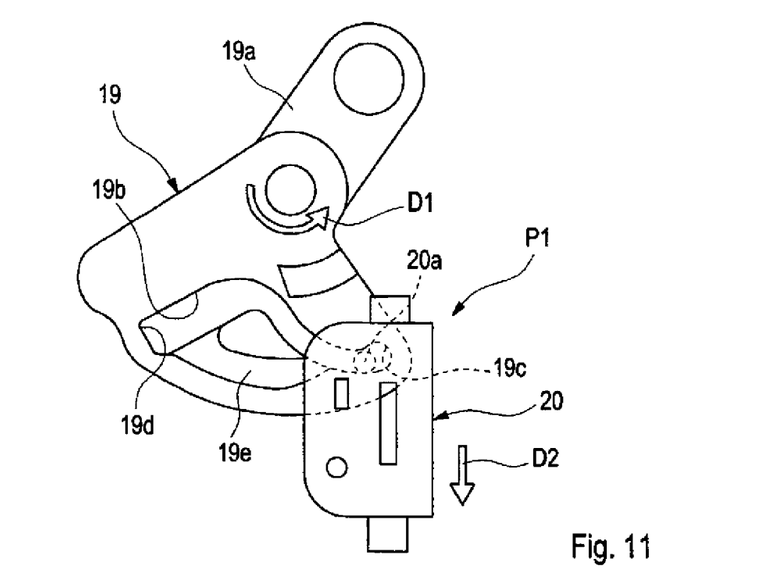

The plan view of FIG. 11 shows the coupling of the slider part 20 with the drive plate 19 by way of the drive pin 20a, wherein the drive pin 20a is located at the motion link beginning 19c and is thus in a position P1, from which the slider plate 8 is moved into a position effecting the diffuse position of the air guide vanes 2, 2a and 2b. To this end, the electric motor 16 drives the drive plate 19 in the rotational direction D1 via the drive lever 18, whereby the slide part 20 is moved in direction D2 due to the coupling of the drive pin 20a to the motion link 19b. The drive lever 18 is according to FIG. 12 coupled with the drive plate 19 via a rotation axis 18a.

Figure 12:
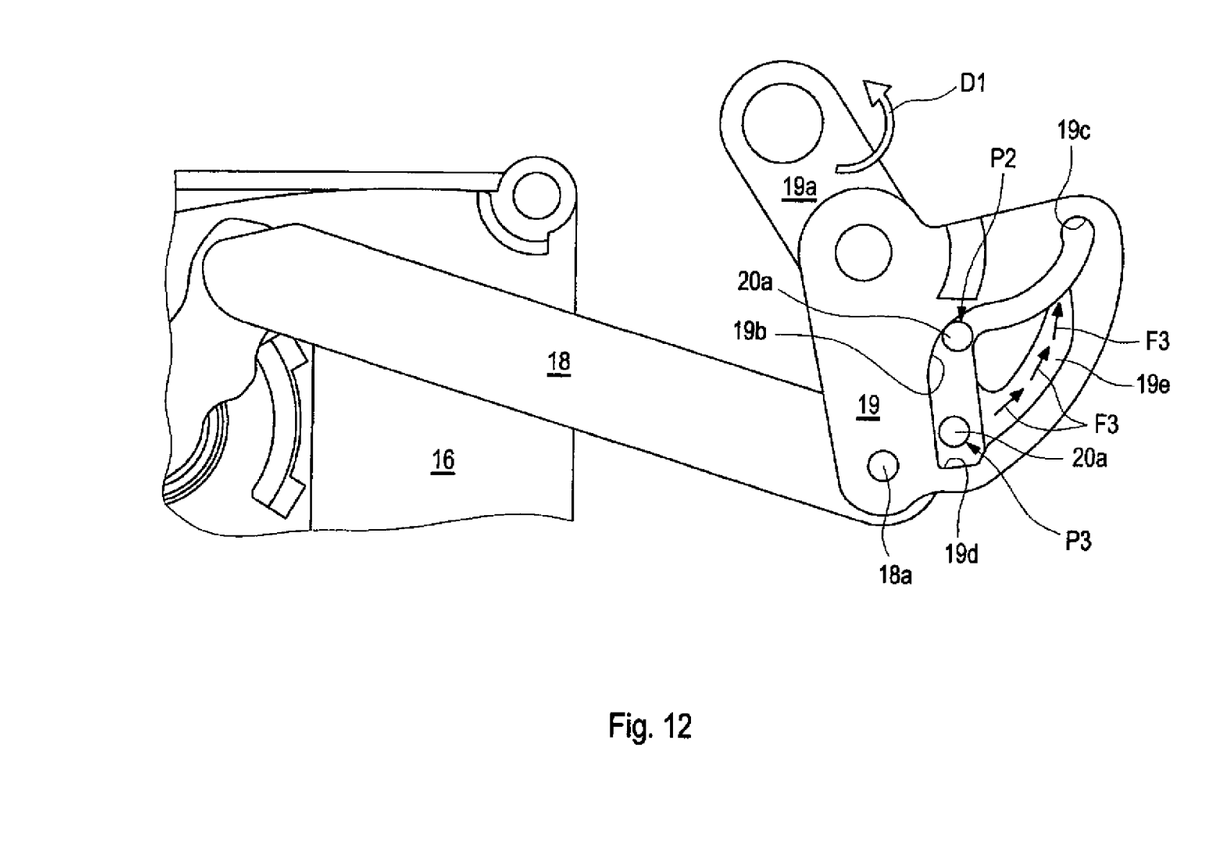

When the drive pin 20a reaches the position P2 shown in FIG. 12, the slider plate 8 is also in a position effecting the diffuse position of the air guide vanes 2, 2a and 2b. When the diffuse position is to be switched off with the actuator, the electric motor 16 is driven in the opposite rotational direction, thereby returning the drive pin 20a from the position P2 to the position P1.

Figure 5:
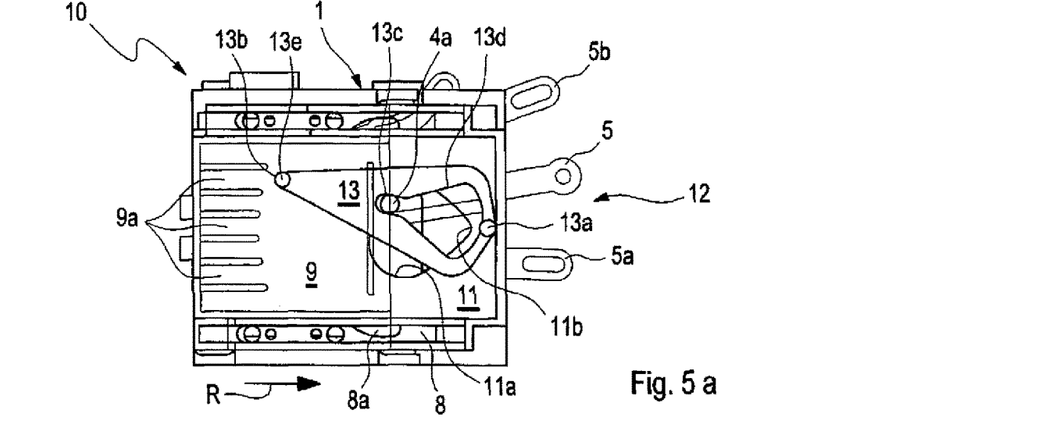

In the exemplary embodiment according to FIGS. 5 and 6, the air vent 1 has an additional reset lever 13, which serves to return the coupling element 4 from the position effecting the diffuse position back into the position that was assumed by the coupling element 4 before the diffuse position was set. This implements a memory function which restores the spot position of the air guide vanes that existed before adjustment into the diffuse position. This reset lever 13 in a way "stores" the position of the coupling lever 4, from which the displacement to the position effecting the diffuse position takes place, so that the reset lever 13 is returned to the "stored" position when the coupling element 4 is moved back.

According to FIGS. 5 and 6, this reset lever 13 is articulated on the outer side of the housing wall 11 with a pivot point 13a in the air outlet area of the air vent 1, so as to be pivotable in a plane parallel to the plane of the housing wall 11. This reset lever 13 has a V-shaped geometry, wherein the pivot point 13a is located at the tip 13b of the edge region opposite the V-shape.

This reset lever 13 is coupled via a sliding block guide 13c with the coupling element 4 in that a V-shaped motion link is operatively connected with the coupling pin 4a. This V-shaped motion link is configured so that the coupling pin 4a is situated in all spot positions, as illustrated in the FIGS. 5a to 5c, in the motion link tip 13d of the V-shape, which is formed as a semi-circle and transitions into the V-shape in the direction of the pivot point. When the coupling element 4 is moved perpendicular to the displacement direction R, the coupling pin 4 retained in the semi-circular motion link tip 13d carries along the reset lever 13 into the respective position. FIG. 5a shows the coupling element 4 in an upper position, which causes a displacement of the air guide vanes 2, 2a and 2b, wherein the air flow is directed downwards in accordance with FIG. 3. When the coupling element 4 is moved downwards, a position according to FIG. 5b is traversed, which causes a neutral position of the air guide vanes 2, 2a and 2b until the coupling element 4 reaches the lowest position according to FIG. 5c, in which the air guide vanes 2, 2a and 2b are in a spot position with the air flow being directed upward.

For realizing this memory function, the slider plate is formed in two parts, thus including a first slider part 8, which corresponds to the slider plate 8 shown in FIGS. 1 to 4, and a second slider part 9, which is fixedly connected to the first slider part 8, so that when the first slider part 8 is displaced, the second slider part 9 is also carried along. This second slider part 9 is arranged in the air vent 1 parallel to the first slider part 8, so that the reset lever 13 can be pivoted between the housing wall 11 and this second slider part 9.

When from the spot position according to FIG. 5c the first slider part 8 together with the second slider part 9 is displaced under actuator-operated control with the drive unit 16 in the displacement direction R by carrying a long the coupling element 4 to a position effecting the diffuse position of the air guide vanes 2, 2a and 2b, a positioning pin 13e arranged on the free end 13b of the reset lever 13 engages in one of several guideways 9a arranged in parallel, wherein the guideways 9a are arranged on the lateral edge adjacent to the positioning pin 13e of the reset lever 13 in parallel with the displacement direction R. These guideways 9a are arranged so that when the two sliding parts 8 and 9 start to be displaced in the displacement direction R, the positioning pin 13e engages with the guideway 9a, without substantially pivoting the reset lever 13.

Figure 6A:
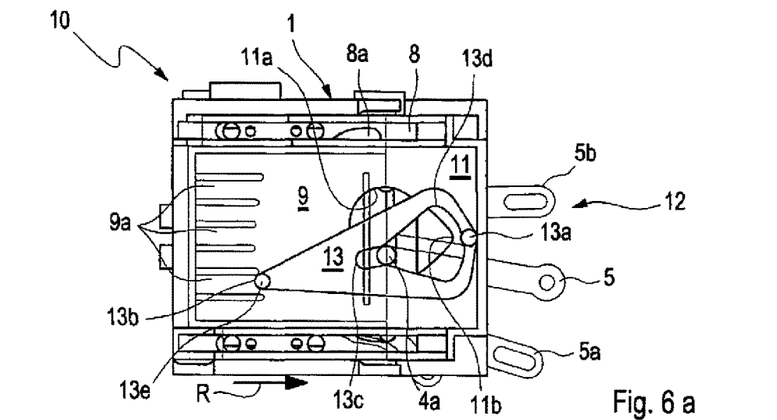
Figure 6B:
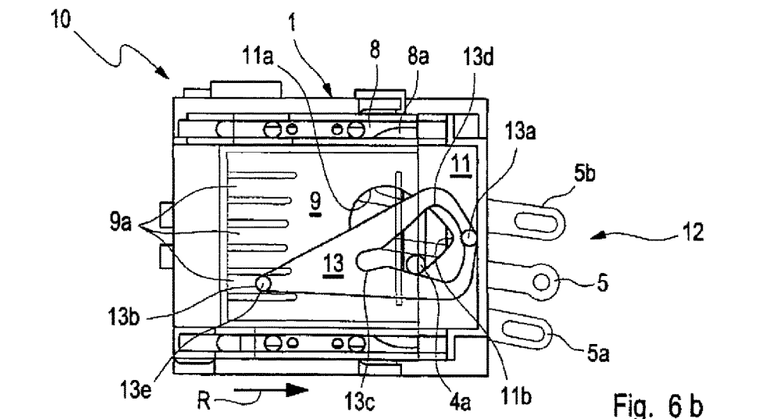
Figure 6C:
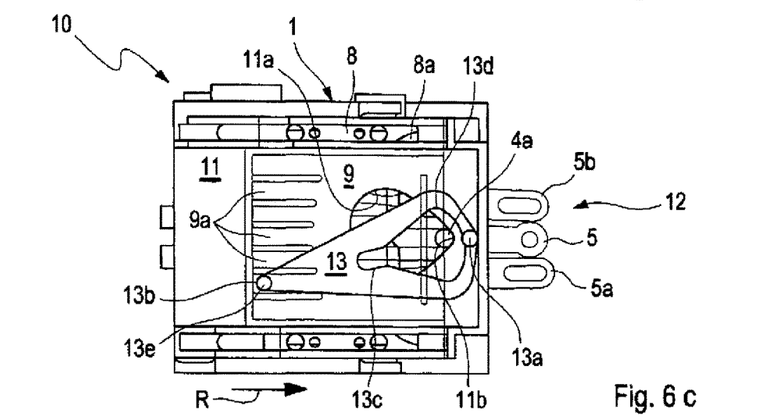

The location of the guideway 9a guiding the positioning pin 13e then corresponds to the current position of the coupling element 4, as illustrated for example in FIG. 5c, from which the coupling element 4 is displaced into the position effecting the diffuse position according to FIGS. 6a to 6c.

When the two slider parts 8 and 9 are displaced from the position shown in FIG. 5c into a position according to FIG. 6c, the coupling pin 4a moves out of the motion link tip 13d and is first guided by the V-shaped motion link 13c before guidance is taken over by the heart-shaped motion link 11a of the housing wall 11. In this position illustrated in FIG. 6b, the positioning pin 13e of the reset lever 13 is also already retracted into the corresponding guideway 9a.

The heart-shaped motion link 11a now assumes guiding the locking pin 4 until the end of the displacement movement of the slider parts 8 and 9, where the locking pin 4 at the apex 11b of the heart-shaped motion link 11a has reached the centering position effecting the diffuse position of the air guide vanes 2, 2a and 2b, as is shown in FIG. 6c.

Conversely, when the slider parts 8 and 9 are moved from the position shown in FIG. 6c to their original position shown in FIG. 5c, the movement of the locking pin 4a is reversed, i.e. in the sequence of FIGS. 6b and 6a, until the locking pin 4a shown in FIG. 6a is guided by the motion link 13d into the semicircular motion link tip 13c, with this position corresponding exactly to the original position of the coupling element 4 according to FIG. 5c, because the reset lever 13 is held in position by the guideway 9a, which in turn corresponds to the initial position according to FIG. 6c for displacing the coupling element 4 into the position effecting the diffuse position.

Figure 7:
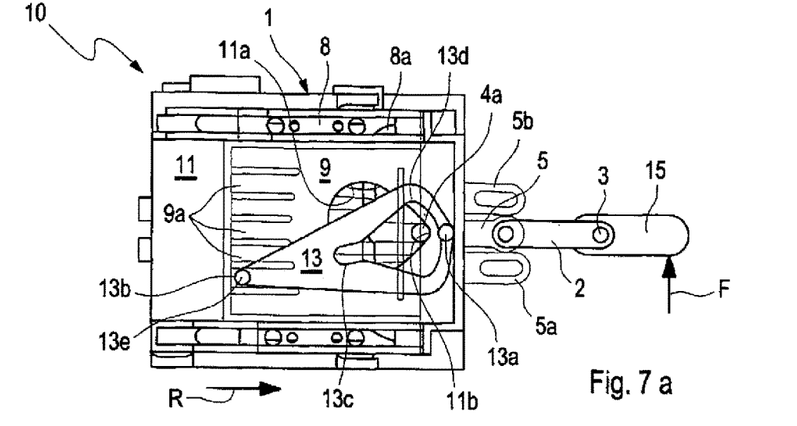
Figure 8:
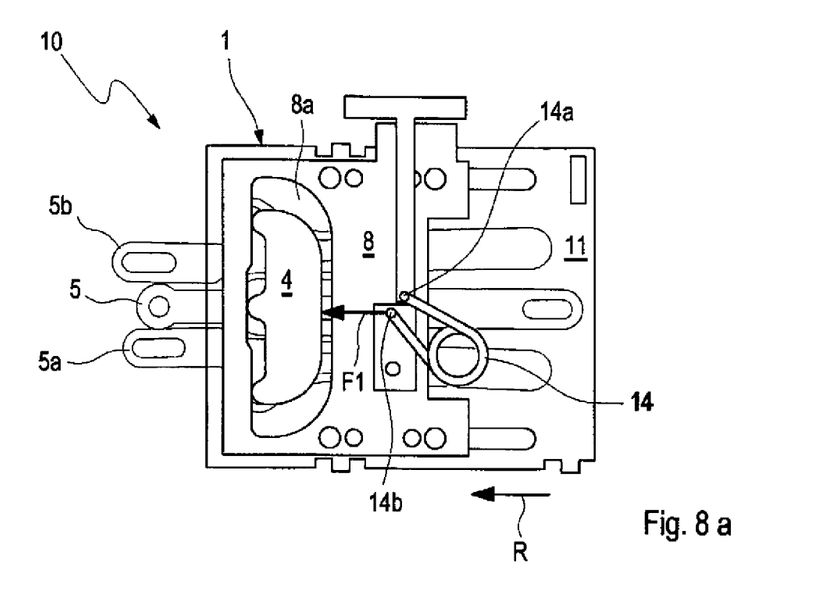
FIG. 8 is a schematic rear view of the air vent according to FIG. 7, FIG. 9 a schematic perspective view of an air vent according to the invention with an electric drive for actuator-operated adjustment of the air guide vanes between a spot position and a diffuse position, FIG. 10 a schematic perspective view of a drive plate of the slider plate, FIG. 11 a schematic plan view of a part of the drive arrangement of the slider plate, and FIG. 12 a schematic plan view of a portion of the drive arrangement formed of drive lever and the drive plate.

FIGS. 7 and 8 show an exemplary embodiment wherein in spite of the actuator-operated diffuse position set with the drive unit 16, this diffuse position can be switched off by manually operating a control element 15 connected to the neutral vane 2, i.e. the air guide vanes 2, 2a and 2b can be swung back into a spot position, without damaging the mechanism, so that this function which will be explained in the following is referred to as misuse protection.

Reference is made first to FIGS. 8a and 8b, which in contrast to FIGS. 1 to 7 show the backside of this representation, which corresponds to the outside of the air vent 1 according to FIG. 9.

According to FIGS. 8a and 8b, the slider plate 8 (this refers also to the first slider part 8) is coupled with the housing 1 of the air vent 1 by articulating one end 14a of a leg spring forming a spring element 14 on the housing 1 of the air vent 1 and pivotally connecting the other end 14b of the leg spring to the slider plate 8. The spring force F1 and F2 of the leg spring 14 operates to urge the slider plate 8 either into the diffuse position of the air guide vanes 2, 2a and 2b according to FIG. 8a or into a position effecting a spot position of the air guide vanes 2, 2a and 2b in accordance with FIG. 8b, wherein the leg spring 14 passes during a displacement of the slider plate 8 between these positions across its dead center position with maximum spring force.

The dead-center position of the leg spring 14 is attained in a displacement position of the slider plate 8 when the leg spring 14 has rotated so far about the end 14a so that the direction of force of the leg spring 14 is perpendicular to the direction of movement, i.e. the displacement direction R. As soon as this point has been traversed, the spring force acts again on the slider plate 8, depending on the direction in which the slider plate 8 is displaced, i.e. either in the direction of the position effecting the diffuse position (FIG. 8a) or in the direction effecting a spot position (FIG. 8b).

As already described above, in this embodiment, in the diffuse position of the air guide vanes 2, 2a and 2b, an operating force according to the force arrow F can be applied to the control element 15 connected with the neutral vane 2, as shown in FIGS. 7a and 7b. This causes the neutral vane 2 to pivot about the axis 3, whereby the end of the rocker 5 connected to the neutral vane 2 is pushed downwards, causing the transverse force acting on the coupling pin 4a to guide the coupling pin 4a from the heart-shaped apex 11b along the motion link of the sliding block guide 11a, as shown in FIG. 7b. It will be understood that the slider 8 is carried along by the coupling element 4 during this movement. This movement is possible because—as described above—the slider 8 is held in the diffuse position only by the leg spring 14 which is supported on the housing of the air vent 1.

Once the movement of the slider plate 8 initiated manually by the control element has passed the dead center position of the leg spring 14, the slider plate 8 is pushed back into the starting position shown in FIG. 7c, starting from the position illustrated in FIG. 7b, wherein the starting position causes the spot position due to the aforedescribed memory function that was assumed by the air guide vanes 2, 2a and 2b before adjustment into the diffuse position.

This manual displacement of the slider plate 8 from a position effecting the diffuse position occurs, as described above with reference to FIG. 12, from a position P2 of the drive pin 20a. The resulting displacement of the slider plate out of the diffuse position when the leg spring 14 has passed over the dead center position causes the drive pin 28 of the slider part 20 to move, as a result of the coupling between the slider part 20 and the drive plate 19, from the position P2 along the motion link 19b to the motion link end 19d, which is designated in FIG. 12 as the position P3. At the same time, the electric motor 16 and the drive lever 18, respectively, are still in a position that corresponds to the engaged diffuse position.

The drive lever 18 rotates only after the electric motor 16 is controlled again, i.e. is returned to its initial position, for example by a climate control, causing the drive plate 19 to pivot opposite to the rotation direction D1, whereby the drive pin 20a snaps on the guide groove 19e and is returned from the position P3 along the guide groove 19e in accordance with the arrows F3 to the area of the motion link beginning 19c, where it latches again into its initial position P1 (see FIG. 11). This operation requires that the drive plate is elastic.

It is thus possible to manually switch off the actuator-initiated diffuse position of the air guide vanes 2, 2a and 2b without damaging the drive unit 16, so that the air guide vanes 2, 2a and 2b are moved again into a spot position or the previously occupied spot position.

In the aforedescribed exemplary embodiments, a drive unit 16 is used to adjust the air guide vanes 2, 2a and 2b from a spot position into the diffuse position, or vice versa to return the air guide vanes from the diffuse position into the previously set spot position. Likewise, the slider plate 8 can be manually adjusted with a suitable control element, wherein the aforedescribed memory function and the misuse function can be implemented in the same way.

Likewise, additional air guide vanes, which are treated in the same way according to the invention as outer vanes, may be provided instead of the three air guide vanes 2, 2*a* and 2*b* illustrated in the exemplary embodiments.

Furthermore, the mechanical components may be combined in a standard module, so that such standard module can be inserted into a preconfigured air vent housing with air guide vanes. In particular, the standard module should be constructed so that these coupling rods can be exchanged against a standard module according to the invention when using conventional air vents, i.e. air vents having coupling rods for adjusting the air guide vanes. To this end, a standard module includes at least the rockers 5, 5*a* and 5*b*, the coupling element 4 and the slider plate 8.

Advantageously, such standard module can be easily installed and pretested.

The invention claimed is:

1. An air vent of a ventilation and heating module for motor vehicles, comprising:
   a plurality of air guide vanes which extend at least in a horizontal direction and have a first end that can be pivoted about a vehicle-fixed axis,
   a separate rocker associated with each of the air guide vanes in one-to-one correspondence and having two ends, wherein a first end of the rocker is coupled with a second end of a corresponding air guide vane and a second end of the rocker is pivotally coupled with the ventilation and heating module, and
   a coupling element comprising coupling pins, each coupling pin engaging in a corresponding first sliding block guide disposed in the rocker associated with each of the air guide vanes, wherein the coupling element is linearly displaceable in a displacement direction perpendicular to the vehicle-fixed axis between a position causing a neutral position of the air guide vanes and a position causing a diffuse position of the air guide vanes,
   wherein one of the plurality of air guide vanes is a neutral vane having two sides, wherein the rocker of the neutral vane is coupled to the coupling element via a straight first sliding block guide, and wherein at least one additional air guide vane constructed as an outer vane is provided on each of the two sides of the neutral vane, wherein the rocker associated with a respective outer vane is coupled to the coupling element via a curved first sliding block guide for producing the diffuse position,
   wherein the coupling element is displaced perpendicular to the displacement direction to produce a spot position of the air guide vanes, wherein the rocker of the neutral vane is coupled with the ventilation and heating module via a second sliding block guide enabling a pivoting movement and wherein the rocker of at least one outer vane arranged on each of the two sides of the neutral vane is coupled with the outer vanes via a third sliding block guide enabling a pivoting movement.

2. The air vent of claim 1, further comprising a movable slider plate having a drive opening configured to receive the coupling element and to transfer a translatory movement of the slider plate to the coupling element.

3. The air vent of claim 2, wherein the drive opening is configured to move the coupling element perpendicular to the displacement direction of the coupling element so as to produce a spot position of the air guide vanes.

4. The air vent of claim 1, wherein the coupling element is coupled with a housing wall of the ventilation and heating module via a fourth sliding block guide for centering the diffuse position of the air guide vanes.

5. The air vent of claim 4, wherein the fourth sliding block guide comprises a motion link having a substantially heart-shaped apex extending in the first displacement direction of the coupling element, wherein the coupling element is guided in the heart-shaped apex by a coupling pin to produce the diffuse position.

6. The air vent of claim 5, wherein the coupling pin couples the coupling element to the fourth sliding block guide disposed in the housing wall.

7. The air vent of claim 5, wherein the coupling pin couples the rocker associated with a neutral vane.

8. The air vent of claim 5, wherein the drive unit comprises an electric motor.

9. The air vent of claim 4, further comprising:
   a reset lever articulated in the region of an outlet opening of the air vent and coupled with the coupling element for pivoting into a memory position corresponding to a spot position of the air guide vanes,
   a free end of the reset lever, which is pivoted into the memory position while maintaining its pivot position, is operatively connected with a slider plate that is operatively connected with the coupling element, wherein displacement of the slider plate causes the diffuse position of the air guide vanes, and
   the reset lever is coupled to the coupling element via a fifth sliding block guide which upon displacement of the slider plate carries the coupling element along from the diffuse position into the memory position.

10. The air vent of claim 9, wherein the reset lever comprises a positioning pin engaging in guideways of the slider plate for operatively connecting the free end of the reset lever with the slider plate.

11. The air vent of claim 9, wherein the coupling pin of the fourth sliding block guide which couples the coupling element with the housing wall of the ventilation and heating module is constructed to be coupled with the reset lever.

12. The air vent of claim 9, further comprising a spring element that is articulated on the housing wall of the ventilation and heating module, wherein the slider plate is operatively connected to the spring element, wherein a spring force of the spring element urges the slider plate either into the spot position of the air guide vanes or into the diffuse position of the air guide vanes, wherein the spring element passes over its dead center position with maximum spring force when the slider plate is displaced between the spot position and the diffuse position.

13. The air vent of claim 12, further comprising a control element for manual operation of at least one air guide vane, wherein the fourth sliding block guide in the housing wall of the ventilation and heating module is configured to define the movement of the coupling element when the control element is operated in the diffuse position of the air guide vanes, wherein the movement of the coupling element is transferred to the slider plate, while simultaneously passing over the dead-center position of the spring element.

14. The air vent of claim 13, wherein the slider plate is constructed in two parts, with a first slider part receiving the coupling element and a second slider part being coupled to the first slider part and receiving guideways for coupling with the free end of the reset lever.

15. The air vent of claim 9, further comprising a drive unit connected to the slider plate for switching between the spot position of the air guide vanes and the diffuse position, and vice versa.

16. A standard module constructed as a stand-alone mechanical assembly inserted into a conventionally constructed air vent having a plurality of air guide vanes which extend at least in a horizontal direction and have a first end that can be pivoted vertically about an axis, the standard module comprising:
- a separate rocker associated with each of the air guide vanes in one-to-one correspondence and having two ends, wherein a first end of the rocker is coupled with a second end of a corresponding air guide vane and a second end of the rocker is pivotally coupled with the ventilation and heating module, and
- a coupling element comprising coupling pins, each coupling pin engaging in a corresponding first sliding block guide disposed in the rocker associated with each of the air guide vanes, wherein the coupling element is linearly displaceable in a displacement direction perpendicular to the vehicle-fixed axis between a position causing a neutral position of the air guide vanes and a position causing a diffuse position of the air guide vanes,
- a movable slider plate having a drive opening configured to receive the coupling element and to transfer a translatory movement of the slider plate to the coupling element, wherein one of the plurality of air guide vanes is a neutral vane having two sides, wherein the rocker of the neutral vane is coupled to the coupling element via a straight first sliding block guide, and wherein at least one additional air guide vane constructed as an outer vane is provided on each of the two sides of the neutral vane, wherein the rocker associated with a respective outer vane is coupled to the coupling element via a curved first sliding block guide for producing the diffuse position, wherein the coupling element is displaced perpendicular to the displacement direction to produce a spot position of the air guide vanes, wherein the rocker of the neutral vane is coupled with the ventilation and heating module via a second sliding block guide enabling a pivoting movement and wherein the rocker of at least one outer vane arranged on each of the two sides of the neutral vane is coupled with the outer vanes via a third sliding block guide enabling a pivoting movement.

* * * * *